Aug. 15, 1950     M. H. BLOCK     2,519,103
METHOD OF MAKING EDUCATIONAL PHONOGRAPH RECORDS
Filed June 16, 1947
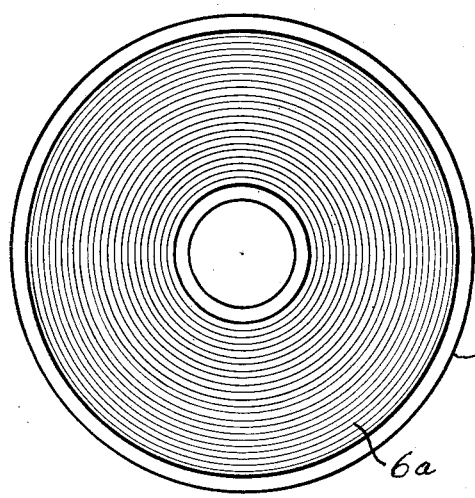
FIG. 2.
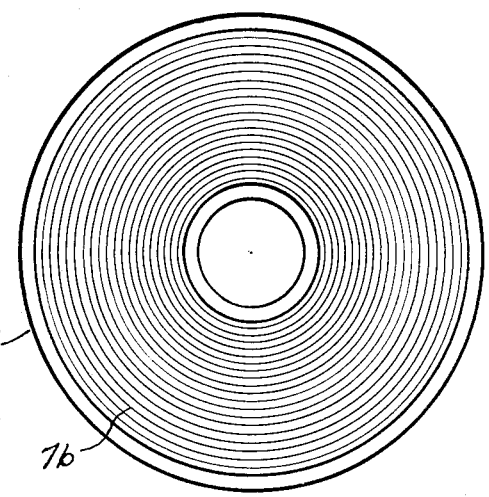
FIG. 2 A
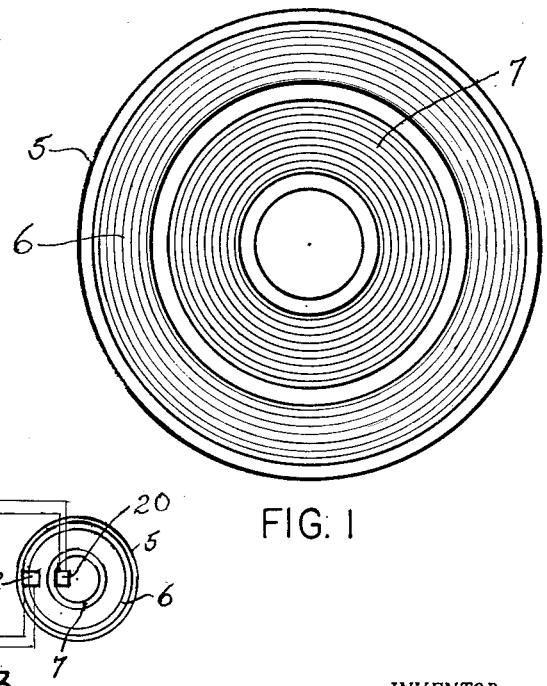
FIG. 1
FIG. 3
*INVENTOR.*
MORRIS H. BLOCK
BY *Martin E Anderson*
*attorney*

Patented Aug. 15, 1950

2,519,103

UNITED STATES PATENT OFFICE 2,519,103

METHOD OF MAKING EDUCATIONAL PHONOGRAPH RECORDS

Morris H. Block, Denver, Colo.

Application June 16, 1947, Serial No. 754,799

1 Claim. (Cl. 274—46)

This invention relates to improvements in methods of making phonograph records and has reference more particularly to records for use in teaching singing, for example, amateur singers in solo or chorus.

Professional singers are usually provided with a professional orchestral accompaniment, whereas, the ordinary amateur singer must be accompanied with a piano or organ, usually played by an amateur.

It is evident that a full orchestral accompaniment makes it possible for a singer to give a better performance than he or she could give with an ordinary piano accompaniment, and many amateurs who have never had the advantage of a full professional orchestral accompaniment will perform better, and perhaps equal professional singers, when provided with such accompaniment.

It is the object of this invention to provide phonograph records by means of which an amateur singer may first have the opportunity to listen to a professional singer with the full orchestral accompaniment, and, by means of the same record have an opportunity at any time to sing the same song with the same accompaniment.

This invention, briefly described, consists of making a record having on one side, or part thereof, a record of the song sung with a full professional orchestral accompaniment and on the other side, or on another part thereof, a record of the accompaniment only.

By means of records of this type an amateur will, first of all, be given the opportunity to learn the expert technique by listening to a professional singer, after which he may employ the same recorded orchestral accompaniment for his own singing.

Records made in accordance with this invention can be employed for group rehearsals with full orchestral accompaniment and provide opportunities for schools and clubs to practice singing with the most desirable musical accompaniment.

Another use for such records would be at rehearsals where the singer could rehearse to the orchestral music without the expense of an orchestra. Shows en route can also employ such records with a great saving in expense because they can, in this manner, be provided with the proper musical accompaniment without the expense of transporting and paying for an orchestra, and in the same manner church choirs and the congregation can have the benefit of musical accompaniment played by some renowned organist.

Having thus indicated the objects of this invention, and some of the uses to which it may be put, the invention itself will now be described in greater detail, and for this purpose reference will be had to the accompanying drawing in which the invention has been illustrated, and in which:

Figure 1 shows one side of a phonograph record disk in which a portion of the disk has recorded thereon the song, together with the musical accompaniment and the other part of the disk has the same musical accompaniment without the voice of the singer;

Figure 2 shows another style of record in which one side is devoted entirely to the song with its musical accompaniment, whereas, the reverse side thereof is devoted to the musical accompaniment alone;

Figure 2a shows the reverse side of the record of Figure 2; and

Figure 3 shows a diagrammatic arrangement for making the foregoing types of records.

In the drawing the records have been designated by reference numeral 5 and are of ordinary construction.

Referring now more particularly to Figure 1, that part of the record that has been designated by reference numeral 6 contains the song with the musical accompaniment as it is heard by the audience listening to the singer and the part designated by reference numeral 7 contains the musical accompaniment without the song or melody.

The arrangement illustrated in Figures 2 and 2a is better suited for lengthy songs and the side that is represented by 6a contains the song with the musical accompaniment, whereas on the other side the music 7b alone is recorded Such records can easily be made by having the orchestra in a sound-proof room of the type usually employed in connection with radio work and having the singer in another room in which the music is reproduced by loud speakers. The rooms should be separated by a clear glass, sound proof partition so that the orchestra leader can see the singer and hear the song and the accompaniment by means of ear phones. The leader will thus be in a position substantially as if the singer and the orchestra were in the same room. Two recordings can, therefore, be made simultaneously, so that the musical accompaniment will be an exact reproduction of that employed during the singing. If the record containing the song and the accompaniment were made at one time and the music repeated, there might be some discrepancies which will not be present if the record is made in the manner indicated.

Figure 3 diagrammatically illustrates the manner in which the records may be made. The orchestra 10 is disposed at a first locus in a sound proof room 11. The singer 12 is at a second locus in another room 13 which is audibly isolated from room 11 by a transparent glass partition 14. The leader 15 is at a third locus 16 where he can see the singer and hear the song and accompaniment with ear phones 17. A transmitter 18 transmits the accompaniment to a loud speaker 19 and to a recording device 20. A transmitter 21 transmits the singer's melody, and the transmitted accompaniment from loud speaker 19, to another recording device 22.

In the above, reference has been made to singing only, whereas, the method and the records are as well suited for instrumental soloists. Orchestras usually have a soloist that carries the melody. Let us now assume this to be a violin played by an artist or professional. The records are made in the manner described in connection with the singer. The owner of the record can then, first, listen to the professional violinist playing to the full orchestral accompaniment, after which he may play to the same accompaniment. When the accompaniment is piano music only, a pianola may be employed which cuts the music roll while the music and song are recorded on phonograph record. The amateur may then listen to the song and accompaniment from the phonograph record and reproduce the music for his own accompaniment by means of a record made from a pianola roll.

By means of records of the type above described, it is possible for amateur singers or solo players to have the benefit of listening to renowned singers or players performing under the most desirable conditions and from such records they can therefore learn the fine points of technique that could otherwise be imparted to them only by expensive teachers. In addition to the advantages of hearing the song or music rendered with the proper musical accompaniment, they are also in possession of the accompaniment itself to which they may sing or play, and in this manner perfect themselves in technique and artistic execution at a nominal expense.

In the above description the invention has been described in connection with ordinary phonograph records of the disk type. It is to be understood, however, that the invention is not limited to such records. The cylindrical type of record can be employed, if desired. It is also possible and practical to use a steel wire record such as is employed with the ordinary telegraphone.

Another type of record is the sound track now in common use in connection with moving pictures. When film and sound track records are used, pictures of the orchestra may be shown simultaneously with the playing or reproduction of the music.

When the term "melody" is employed, it is to be understood as including any means for carrying or producing the melody whether this be the vocal cords or any other musical instrument.

There may be other ways of producing the records than the one described and applicant does not desire to be limited to the specific method described.

Having described the invention what is claimed as new is:

The method of simultaneously making two educational recordings, one being an instrumental orchestral accompaniment and the other the accompaniment and melody thereto, which comprises; playing the accompaniment at one locus, transmitting the accompaniment simultaneously as it is played to a second locus audibly isolated from the first, producing the melody to the transmitted accompaniment at the second locus, simultaneously recording the transmitted accompaniment and melody together, and the accompaniment alone, and manually directing the accompaniment from a third locus visible to the loci where the accompaniment and melody are produced.

MORRIS H. BLOCK.

REFERENCES CITED

The following references are of record in the file of this patent:

UNITED STATES PATENTS

| Number | Name | Date |
|---|---|---|
| 1,229,142 | Saenger | June 5, 1917 |
| 1,645,295 | Rogers | Oct. 11, 1927 |
| 1,653,458 | Green | Dec. 20, 1927 |
| 1,765,517 | Wier | June 24, 1930 |
| 1,765,735 | Phinney | June 24, 1930 |
| 1,936,886 | Shearer | Nov. 28, 1933 |
| 1,937,919 | Smith | Dec. 5, 1933 |